US007516892B2

(12) United States Patent
Haas et al.

(10) Patent No.: US 7,516,892 B2
(45) Date of Patent: Apr. 14, 2009

(54) ELECTRONIC VOTING SYSTEM AND METHOD HAVING CONFIRMATION TO DETECT MODIFICATION OF VOTE COUNT

(75) Inventors: Bertrand Haas, New Haven, CT (US); James A. Euchner, Waccabuc, NY (US)

(73) Assignee: Pitney Bowes Inc., Stamford, CT (US)

( * ) Notice: Subject to any disclaimer, the term of this patent is extended or adjusted under 35 U.S.C. 154(b) by 8 days.

(21) Appl. No.: 11/637,403

(22) Filed: Dec. 12, 2006

(65) Prior Publication Data

US 2008/0135632 A1 Jun. 12, 2008

(51) Int. Cl.
*G06K 17/00* (2006.01)
*G07C 13/00* (2006.01)

(52) U.S. Cl. ............................ 235/386; 235/51; 705/12

(58) Field of Classification Search .................. 235/51, 235/386; 705/12

See application file for complete search history.

(56) References Cited

U.S. PATENT DOCUMENTS 4,641,240 A * 2/1987 Boram ........................ 705/12
6,081,793 A * 6/2000 Challener et al. ............. 705/50
6,250,548 B1 * 6/2001 McClure et al. ............... 235/51
6,412,692 B1 * 7/2002 Miyagawa .................. 235/382
6,540,138 B2 * 4/2003 Hall et al. .................. 235/386
6,688,517 B1 * 2/2004 McClure et al. ............... 235/51
6,769,613 B2 * 8/2004 McDermott et al. .......... 235/386
6,817,515 B2 * 11/2004 Winnett ....................... 235/51
6,865,543 B2 * 3/2005 Gibbs, Sr. .................... 705/12
6,942,142 B2 * 9/2005 Barmettler et al. ............ 235/51
6,968,999 B2 * 11/2005 Reardon ..................... 235/386
7,054,829 B2 * 5/2006 Campo et al. ................. 705/12
7,178,730 B1 * 2/2007 Jamison et al. ............. 235/386
2002/0066780 A1 * 6/2002 Balolia ........................ 235/51
2002/0077886 A1 * 6/2002 Chung ......................... 705/12
2002/0087394 A1 * 7/2002 Zhang ......................... 705/12
2005/0145695 A1 * 7/2005 Kelly ......................... 235/386
2005/0211778 A1 * 9/2005 Biddulph .................... 235/386
2005/0284936 A1 * 12/2005 Pazniokas et al. ........... 235/386
2006/0031116 A1 * 2/2006 Bogasky et al. ............... 705/12
2006/0196939 A1 * 9/2006 Kim et al. ................... 235/386
2007/0051804 A1 * 3/2007 Anderson et al. ........... 235/386

* cited by examiner

*Primary Examiner*—Michael G Lee
*Assistant Examiner*—Ali Sharifzada
(74) *Attorney, Agent, or Firm*—Brian A. Lemm; Angelo N. Chaclas

(57) ABSTRACT

A voting system includes one or more voting machines provided at a specific location, wherein for each authorized voter one of the voting machines is adapted to record a first set of voting selections, and one or more validation machines provided at the specific location, wherein for each authorized voter one of the validation machines is adapted to present the first set of voting selections to the authorized voter and record a second set of voting selections only if the first set of voting selections is confirmed. A first vote tally is determined from the first set of voting selections of each authorized voter, and a second vote tally is determined from the second set of voting selections of each authorized voter. The first vote tally is then compared to the second vote tally, wherein a vote modification may have occurred if the tallies do not match.

6 Claims, 4 Drawing Sheets

ELECTRONIC VOTING SYSTEM AND METHOD HAVING CONFIRMATION TO DETECT MODIFICATION OF VOTE COUNT

FIELD OF THE INVENTION

The present invention relates to voting systems, and in particular to an electronic voting system that reduces the potential that voter counts can be modified without being detected.

BACKGROUND OF THE INVENTION

Most conventional voting systems in place around the world utilize either paper ballots or mechanical voting booths having mechanical switches and levers that, when actuated, increment a plurality of mechanical counters. These conventional systems present a number of problems for election processes. For example, paper ballots can become physically damaged or altered between the time the voter makes his or her selection and the time a ballot-counting machine eventually reads the voter's selection on the ballot. In addition, with paper ballots, voters can inadvertently cast a vote for the wrong candidate by, for example, punching a hole or placing a mark next to a different candidate than was intended. Mechanical voting booths, while solving some of the problems presented by paper ballots, present problems of their own. For instance, voting booths are fairly expensive, have many mechanical parts which require routine maintenance and repair, and are typically heavy and cumbersome to move and set up.

More recently, electronic voting systems have been developed with an eye toward solving the problems presented by systems that employ paper ballots and/or mechanical voting booths. However, none of the electronic voting systems developed to date has proven to be secure and efficient enough to result in the widespread use thereof (in place of existing paper ballot and/or mechanical voting booth systems). One main concern with electronic voting systems is that a company providing the electronic voting machines may illegally modify the vote counts in a manner that is difficult to notice and/or detect. Thus, there is a need for an electronic voting system that reduces the potential that voter counts can be modified without being detected.

SUMMARY OF THE INVENTION

In one embodiment, the present invention provides a voting method that includes first determining whether each of a plurality of potential voters is authorized to vote at a specific location, wherein each of the potential voters determined to be authorized to vote at the specific location is an authorized voter. The method further includes for each authorized voter: (i) recording a first set of voting selections in a voting step, and (ii) separately recording a second set of voting selections in a validation step wherein the authorized voter is presented with the first set of voting selections of the authorized voter and asked to confirm the first set of voting selections and wherein the second set of voting selections are recorded only if the authorized voter confirms the first set of voting selections. The method also includes determining from the first set of voting selections of each authorized voter a first vote tally for the specific location, determining from the second set of voting selections of each authorized voter a second vote tally for the specific location, comparing the first vote tally to the second vote tally, and determining that a vote modification may have occurred if the first vote tally and the second vote tally do not match. The step of determining whether each of a plurality of potential voters is authorized to vote at a specific location may include checking an identification of each of the potential voters and checking whether each of the potential voters is on a list of voters authorized to vote at the specific location.

The voting step in the method may further include for each authorized voter providing the authorized voter with a voting receipt including a listing of the first set of voting selections for the authorized voter. The listing of the first set of voting selections for the authorized voter may be machine readable and encrypted, wherein for each authorized voter the validation step further comprises determining whether the listing can be read and validated, and wherein the authorized voter is presented with the first set of voting selections and asked to confirm the first set of voting selections only if it is determined that the listing can be read and validated.

In one particular embodiment, the method further includes counting each authorized voter to determine a number of authorized voters, counting each first set of voting selections to determine a number of first sets of voting selections, counting each second set of voting selections to determine a number of second sets of voting selections, and determining that a vote modification may have occurred if either or both of the number of first sets of voting selections or the number of second sets of voting selections exceeds the number of authorized voters.

In another embodiment, the invention provides a voting system wherein a determination is made as to whether each of a plurality of potential voters is authorized to vote at a specific location, and wherein each of the potential voters determined to be authorized to vote at the specific location is an authorized voter. The voting system includes one or more voting machines and one or more validation machines provided at the specific location, wherein for each authorized voter one of the one or more voting machines is adapted to record a first set of voting selections, and one of the one or more validation machines is adapted to present the first set of voting selections of the authorized voter to the authorized voter and record a second set of voting selections only if the authorized voter confirms the first set of voting selections. A first vote tally for the specific location is determined from the first set of voting selections of each authorized voter, and a second vote tally for the specific location is determined from the second set of voting selections of each authorized voter. The first vote tally is then compared to the second vote tally, and it is determined that a vote modification may have occurred if the first vote tally and the second vote tally do not match.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
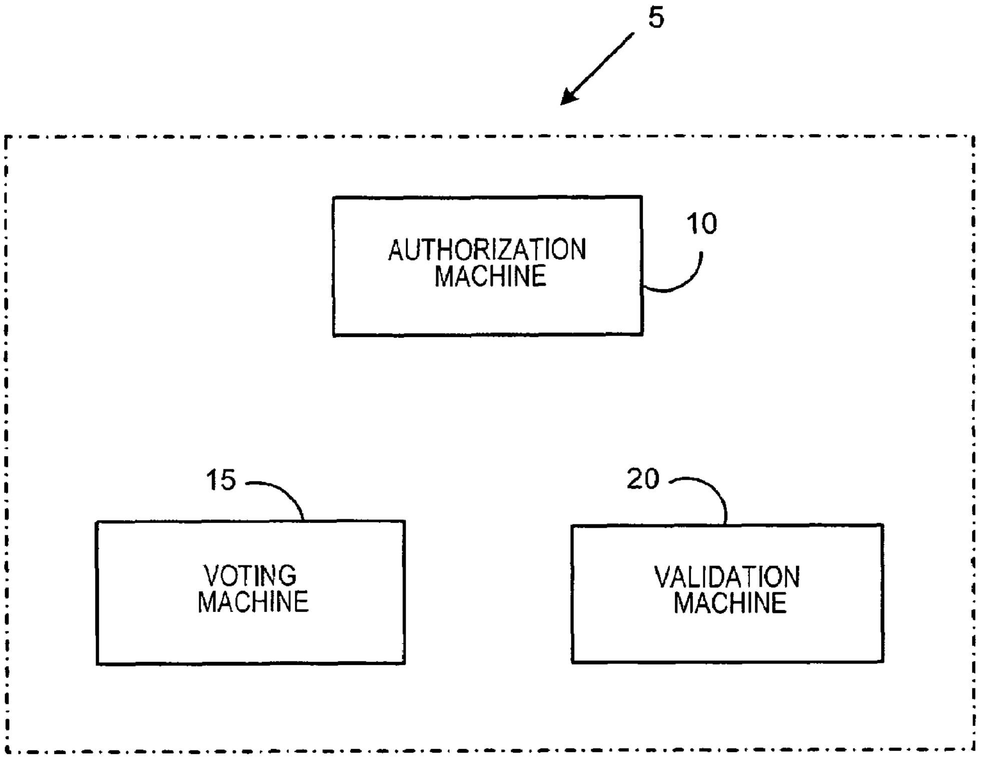
FIG. 1 is a schematic representation of a voting precinct in which an electronic voting system in accordance with an embodiment of the present invention may be implemented.

FIG. 1 is a schematic representation of a voting precinct 5, which may be, for example, a building or a room or rooms within a building, in which an electronic voting system in accordance with an embodiment of the present invention may be implemented. The electronic voting system of the present invention reduces the potential that voter counts can be modified without being detected by providing the following three processes: (i) an identification and authentication process, (ii) a voting process, and (iii) a validation process that is separate from the voting process. As described in more detail elsewhere herein, the separate voting and validation processes allow for a comparison of votes to be made to ensure that there has not been any unauthorized modification of the vote count.

As seen in FIG. 1, the voting precinct 5 includes an optional authorization machine 10, a voting machine 15, and a validation machine 20 for implementing the three processes of the present invention. While a single authorization machine 10, voting machine 15 and validation machine 20 are shown in FIG. 1 for ease of illustration, it should be understood that more than one of each such machine may be provided at the voting precinct 5 for providing the functionality described herein without departing from the scope of the present invention. The authorization machine 10, the voting machine 15 and the validation machine 20 each include a suitable computing device, such as a PC or other embedded computer, that includes a suitable processor and memory for providing the functionality described herein. For example, the authorization machine 10, the voting machine 15 and/or the validation machine 20 are provided with the functional ability and components to generate, print, read and/or validate one or more types of receipts that are described elsewhere herein. The voting machine 10 and validation machine 15 are preferably designed and constructed independently such that knowledge of or hacking of one machine would not compromise the system of the two machines. Preferably, the voting machines 10 and validation machines 15 are manufactured and maintained by separate, different parties, thereby providing a system of checks and balances to prevent one party from illegally modifying the vote counts without being detected by the other party.

Figure 2A:
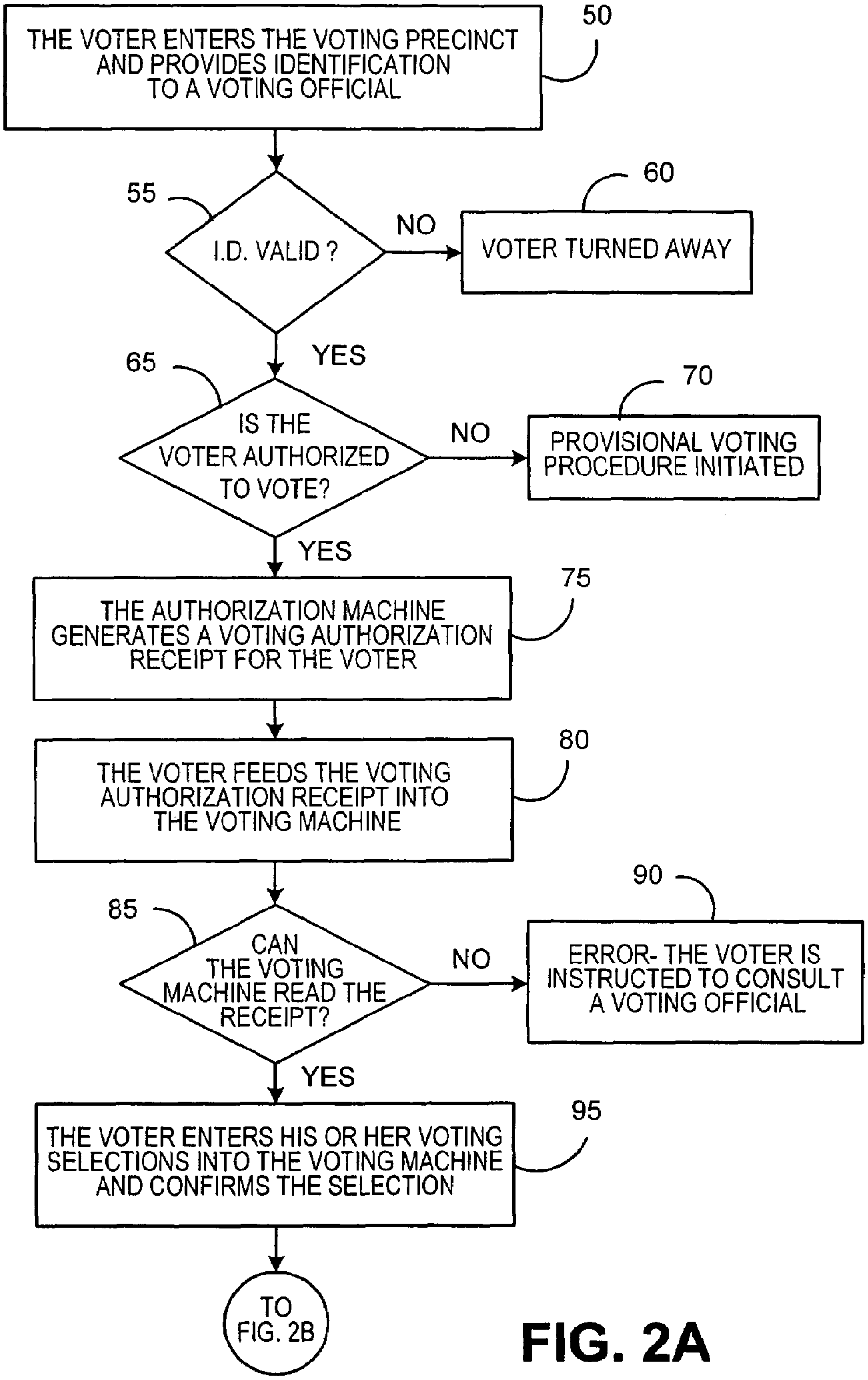
FIGS. 2A-2C are flowcharts that illustrate a method of electronic voting according to an embodiment of the present invention.
Figure 2B:
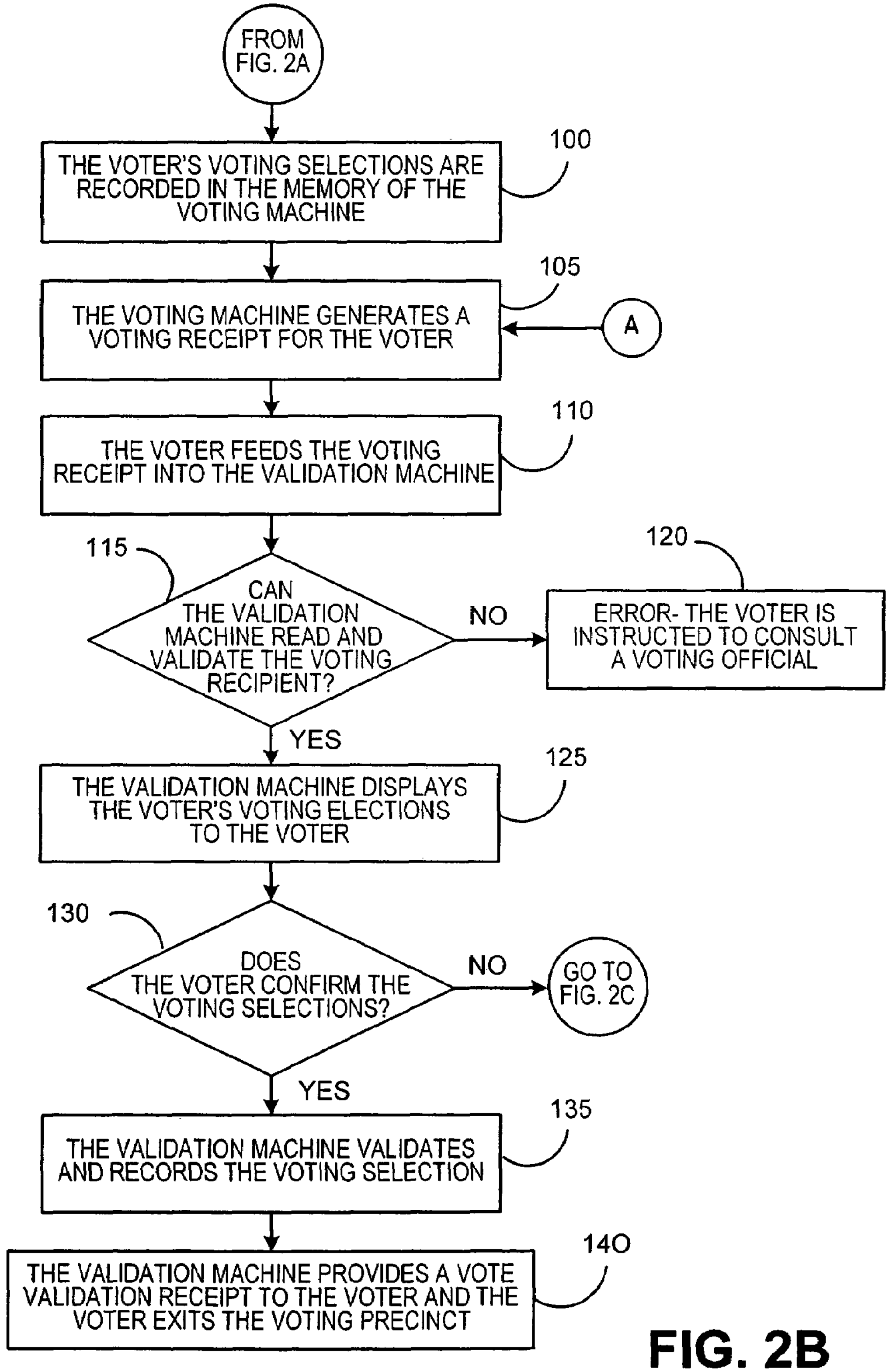
Figure 2C:
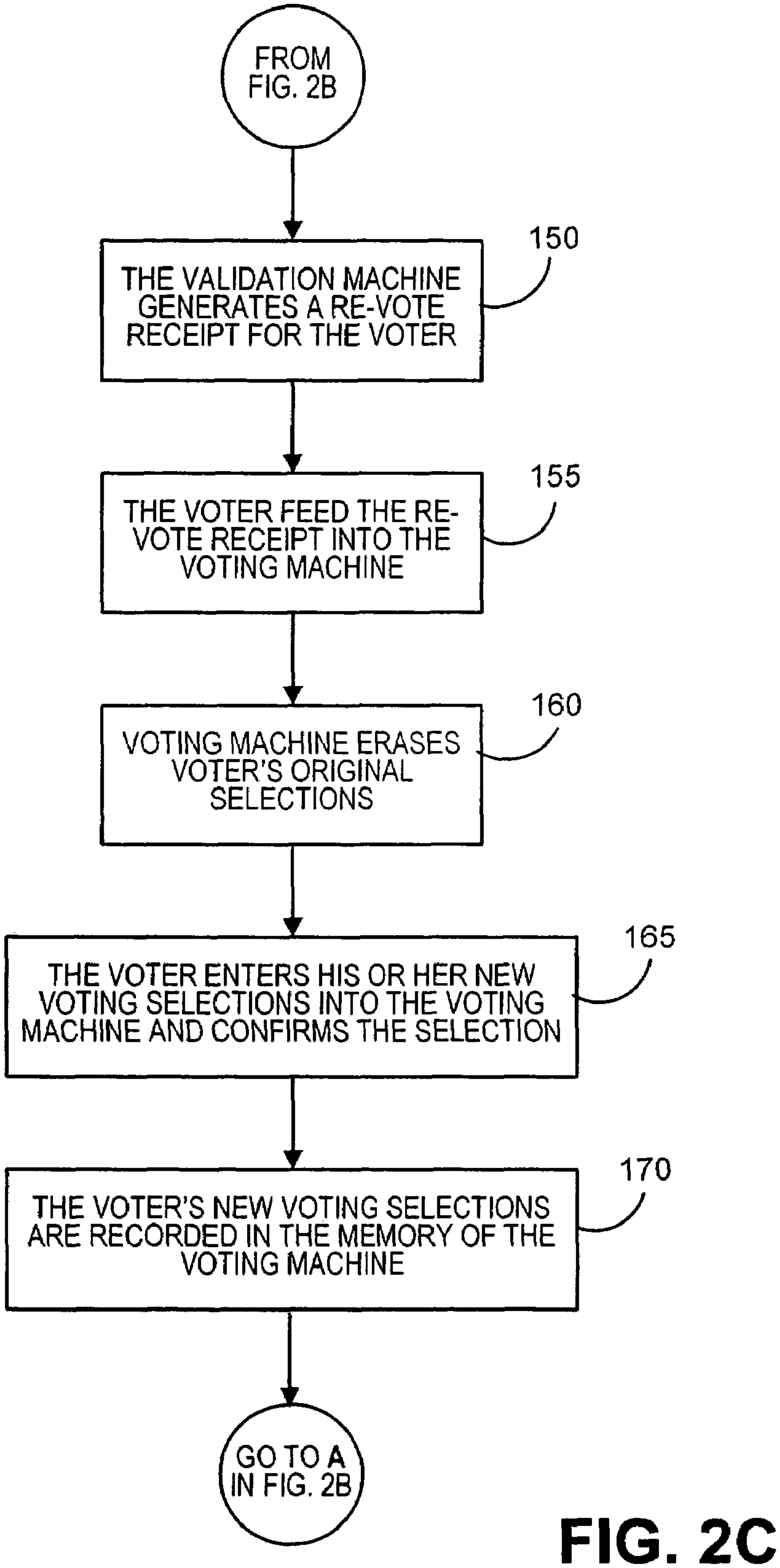

FIGS. 2A, 2B and 2C are flowcharts that illustrate a method of electronic voting according to an embodiment of the present invention that may be implemented in the voting precinct 5 shown in FIG. 1 and that preferably employs the three processes, namely identification/authorization, voting and validation, described elsewhere herein. The method begins at step 50, wherein a voter enters the voting precinct 5 and provides some form of identification, such as a driver's license, to a voting official working at the voting precinct 5. At step 55, a determination is made as to whether the identification is valid, i.e., is it a proper form of identification and can it be used to positively identify the voter. If the answer at step 55 is no, then, at step 60, the voter is turned away. If, however, the answer at step 55 is yes, then, at step 65, a determination is made as to whether the voter is authorized to vote at the voting precinct 5. This is preferably done by checking whether the voter is listed on a list of registered voters eligible to vote at the voting precinct 5. Step 65 may be performed manually by the voting official. Alternatively, and in the preferred embodiment, the voter's identification information may be entered into the authorization machine 10 (if provided) at the voting precinct 5 (e.g., manually through a keyboard or by being read from a barcode or magnetic strip provided on the voter's identification), which in turn determines whether the voter is listed on a list of registered voters eligible to vote at the voting precinct 5. If the answer at step 65 is no, then the voter may be directed to the proper voting precinct for that voter, or, alternatively, as shown in step 70, steps may be taken to allow the voter to cast a provisional vote at the voting precinct 5.

If, however, the answer at step 65 is yes, meaning that the voter is authorized to vote at the voting precinct 5, then, at step 75, the authorization machine 10 generates and prints a voting authorization receipt for the voter. Preferably, the voting authorization receipt includes the voter's identification information, e.g., name and address, in a machine readable form. The voting authorization receipt may also be encrypted utilizing, for example, a hash of the voter's identification information that is generated using a secret seed such that the information looks random and it is difficult to generate without knowledge of the secret seed. This can help prevent fraudulent generation of voting authorization receipts and prevent voter's from attempting to vote more than once without being detected. Next, at step 80, the voter approaches the voting machine 15 provided at the voting precinct 5 (or one of the voting machines 15 if more than one is provided) and feeds the voting authorization receipt into the voting machine 15. At step 85, a determination is made as to whether the voting machine 15 can read the voting authorization receipt. If the answer at step 85 is no, then in step 90 an error condition is identified and the voter is instructed to consult a voting official at the voting precinct 5 to obtain assistance in completing the voting process. If, however, the answer at step 85 is yes, then in step 95 the voter enters his or her voting selections into the voting machine 15 (e.g., using a keyboard, touch screen or some other suitable I/O device provided as part of the voting machine 15) and confirms the selections. It should be understood that if the authorization machine 10 is not provided as part of the system 5, than steps 75, 80 and 85 will not be performed, and instead if it is determined that the voter is authorized to vote in step 65, then the process will proceed to step 95 where the voter will be given access to the voting machine 15 to enter his or her voting selections into the voting machine 15 as described above.

Next, at step 100 (FIG. 2B), the voter's voting selections are recorded in the memory of the voting machine 15. Preferably, the voting machine 15 is provided in a private booth or the like so that the voter may cast his or her vote in privacy. At step 105, the voting machine 15 then generates and prints a voting receipt for the voter. In the preferred embodiment, the voting receipt includes in a machine readable form (e.g., 2-D barcode) an encrypted listing of the voter's confirmed voting selections. The listing may be encrypted by, for example and without limitation, a secret key stored by the voting machine 15 (and, as described below, also stored by the validation machine 20).

Next, at step 110, the voter approaches the validation machine 20 that is provided at the voting precinct 5 (or one of the validation machines 20 if more than one is provided) and feeds the voting receipt into the validation machine 20. For privacy reasons, the validation machine 20 is preferably provided in a private booth or the like. At step 115, a determination is made as whether the validation machine can read and validate the voting receipt. Preferably, to successfully read and validate the voting receipt, the voting machine 20 must be able to read the machine readable information, successfully decrypt the encrypted voting selections (using the stored secret key), and verify any digital signatures or other authentication codes (e.g., a MAC) provided on the voting receipt. If the answer at step 115 is no, then, at step 120, an error condition is identified and the voter is instructed to consult a voting official at the voting precinct 5 to obtain assistance in completing the voting process. If the answer at step 115 is yes, then, at step 125, the validation machine 20 displays the voter's voting selections to the voter, preferably on a screen provided as part of the validation machine 20. Next, at step 130, the voter is asked to confirm his or her previously made voting selections. If the voter confirms his or her voting selections at step 130, then, at step 135, the validation machine 20 validates and records in memory the confirmed voting selections. Then, at step 140, the validation machine 20 provides a vote validation receipt to the voter, that indicates, for example, that the voter has successfully voted and validated his or her vote, and the voter exits the voting precinct 5.

If, however, the voter does not confirm the prior selections in step 130, then an error condition can be indicated and the voter can be instructed to consult a voting official for assistance in completing the voting process or, optionally, the voter may be allowed to change his voting selections utilizing the process as illustrated in FIG. 2C. At step 150, the validation machine 20 will generate a re-vote receipt for the voter. The re-vote receipt would be tied to the original selections made by the voter, thereby allowing the voter's original selections to be erased from the memory of the voting machine. In step 155, the voter feeds the re-vote receipt into the voting machine 15, which in step 160 reads the re-vote receipt and erases the original selections made by the voter that are stored in memory. In step 165, the voter enters his or her new voting selections into the voting machine 15 similarly as described above. In step 170, the voter's new voting selections are recorded in the memory of the voting machine 15. The process then returns to step 105 of FIG. 2B, where the voting machine generates a new voting receipt for the voter and the voter can validate and confirm his or her new vote selections.

At the end of the voting period (e.g., when the polls close at the end of the day), the number of voters authorized to vote in the voting precinct 5 can be determined from the authorization machine 10 (or machines 10 if more than one is utilized) or from the physical records of the voting officials if authorization machines 10 are not provided, and the number of votes recorded in each of the voting machine 15 (or machines 15 if more than one is utilized) and the validation machine 20 (or machines 20 if more than one is utilized) can be determined. The number of votes recorded in each of the voting machine (or machines) 15 and the validation machine (or machines) 20 should not be more than the number of voters admitted to vote as recorded in the authorization machine (or machines) 10 (or voting official records), and the vote tallies (i.e., the number of votes for each candidate) in the voting machine (or machines) 15 and the validation machine (or machines 20) should be identical. A discrepancy in either of the numbers is an indication to the voting officials that a modification in the voting numbers may have occurred, and appropriate action may then be initiated. Thus, by employing the three processes described herein (identification/authorization, voting and validation), the present invention provides an electronic voting system that reduces the potential that voter counts can be modified without being detected.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A voting method, comprising:

recording in a voting machine a first set of voting selections in a voting step for a voter;

printing, with the voting machine, a voting receipt including an encrypted listing of the first set of voting selections for the voter and providing the voting receipt to the voter;

receiving the voting receipt in a validation machine separate from the voting machine;

decrypting the encrypted listing of the first set of voting selections for the voter included in the voting receipt in the validation machine;

displaying the decrypted listing of the first set of voting selections for the voter, using a display of the validation machine, to the voter;

receiving from the voter, at the validation machine, a confirmation of the first set of voting selections for the voter;

upon receiving said confirmation, recording a second set of voting selections for said voter in said validation machine, wherein said second set of voting selections are recorded only if the voter confirms said first set of voting selections;

determining from said first set of voting selections of all voters a first vote tally;

determining from said second set of voting selections of all voters a second vote tally;

comparing said first vote tally to said second vote tally; and determining that a vote modification may have occurred if said first vote tally and said second vote tally do not match.

2. The method according to claim 1, further comprising counting each voter to determine a number of voters, counting each first set of voting selections to determine a number of first sets of voting selections, counting each second set of voting selections to determine a number of second sets of voting selections, and determining that a vote modification may have occurred if either or both of said number of first sets of voting selections or said number of second sets of voting selections exceeds said number of voters.

3. The method according to claim 1, wherein before recording a first set of voting selections is performed, the method further comprises:

determining whether each of a plurality of potential voters is authorized to vote at a specific location, wherein each of said potential voters determined to be authorized to vote at said specific location is a voter.

4. The method according to claim 3, wherein said step of determining whether each of a plurality of potential voters is authorized to vote at a specific location comprises checking an identification of each of said potential voters and checking whether each of said potential voters is on a list of voters authorized to vote at said specific location.

5. A voting system wherein a plurality of voters are authorized to vote at a specific location, the voting system comprising:

one or more voting machines provided at said specific location, wherein for each voter of said plurality of voters, one of said one or more voting machines is adapted to record a first set of voting selections and provide said voter with a voting receipt including an encrypted listing of the first set of voting selections for the respective voter; and one or more validation machines, separate from said voting machines, provided at said specific location, wherein for each said voter one of said one or more validation machines is adapted to receive the encrypted listing of the first set of voting selections for said voter, decrypt the encrypted listing, present said decrypted first set of voting selections of said voter to said voter using a display of the validation machine, request the voter to confirm said first set of voting selections displayed on said display, and record a second set of voting selections in said validation machine only if the voter confirms said first set of voting selections of said voter;

wherein a first vote tally for said specific location can be determined from said first set of voting selections of said plurality of voters, a second vote tally for said specific location can be determined from said second set of voting selections of said plurality of voters, and said first vote tally can be compared to said second vote tally to determine if a vote modification may have occurred if said first vote tally and said second vote tally do not match.

6. The voting system according to claim 5, further comprising one or more authorization machines at said specific location, wherein each of said one or more authorization machines is adapted to determine whether a potential voter is authorized to vote at said specific location by checking whether the potential voter is on a list of voters authorized to vote at said specific location maintained by said one or more authorization machines.

* * * * *